US005181049A

United States Patent [19]

Mackay et al.

[11] Patent Number: 5,181,049

[45] Date of Patent: Jan. 19, 1993

[54] PHASE CHANGE INK REPLENISHMENT SYSTEM

[75] Inventors: Donald Mackay, Calabasas; Joseph Paul, Lancaster; Greg Goble, Tujunga, all of Calif.

[73] Assignee: Dataproducts Corporation, Woodland Hills, Calif.

[21] Appl. No.: 433,716

[22] Filed: Nov. 9, 1989

[51] Int. Cl.[5] ........................ G01D 15/16; B65H 3/30

[52] U.S. Cl. ................................ 316/140 R; 221/298

[58] Field of Search .................... 346/140 R; 221/266, 221/263, 67, 281, 287, 293, 298; 198/468.1, 468.01; 222/251

[56] References Cited

U.S. PATENT DOCUMENTS

| | | | |
|---|---|---|---|
| 3,348,733 | 10/1967 | Johnson | 221/298 |
| 3,533,536 | 10/1970 | Baxendale | 221/281 |
| 4,571,600 | 2/1986 | Hara | 346/140 R |
| 4,590,494 | 5/1986 | Ichihashi et al. | 346/140 R |
| 4,667,206 | 5/1987 | DeYoung | 346/140 PD |
| 4,834,263 | 5/1989 | Becze | 221/298 |
| 4,870,430 | 9/1989 | Daggett et al. | 346/140 PD |
| 4,907,019 | 3/1990 | Stephens | 346/140 R |
| 4,961,081 | 10/1990 | Shiga | 346/140 R |

FOREIGN PATENT DOCUMENTS

| | | | |
|---|---|---|---|
| 1808785 | 6/1970 | Fed. Rep. of Germany | 221/266 |
| 0975322 | 11/1982 | U.S.S.R. | 221/266 |

OTHER PUBLICATIONS

Paul Grafstein and Otto B. Schwarz, *Pictoral Handbook of Technical Devices*, Chemical Publishing Co., Inc., N.Y., 1971, p. 59.

*Primary Examiner*—Benjamin R. Fuller
*Assistant Examiner*—David Yockey
*Attorney, Agent, or Firm*—Spensley Horn Jubas & Lubitz

[57] ABSTRACT

In a color printer including a print head for effecting printing with a phase change ink and provided with a reservoir for holding a supply of the ink, an ink replenishment assembly composed of an ink storage device for storing a plurality of pellets of the ink in solid phase, the storage device having an outlet and a channel for supplying the pellets to the outlet by the force of gravity; a pellet conveying device disposed between the storage device outlet and the print head and movable between a receiving position for receiving at least one pellet from the storage device outlet and a delivery position for conveying a pellet received in the receiving position to the print head reservoir; and a drive member coupled to the pellet conveying device for moving the pellet conveying device between the receiving and delivery positions.

13 Claims, 3 Drawing Sheets

PHASE CHANGE INK REPLENISHMENT SYSTEM

BACKGROUND OF THE INVENTION

The present invention relates to replenishment of ink jet print heads which utilize ink that is converted from a solid state to a liquid state within the print head.

In the printer art, the use of inks, generally known as phase change or hot melt inks, which are heated to place them in the liquid state for application to a substrate is finding growing acceptance in view of a number of advantages offered by such inks.

A print head using such an ink includes a reservoir for storing a supply of the ink together with a heating element for maintaining the ink in the liquid state.

Since the length of time during which a printer can operate continuously depends on the quantity of ink stored in the reservoir, it would be desirable, from the stand point of productivity, for the quantity of ink stored in the reservoir to be as large as possible. However, as the ink storage capacity of a print head increases, so does the moving mass represented by the print head, and this increases the problems associated with displacing the print head at high speed and isolating the remainder of the printer from the forces generated by these displacements. Moreover, as the mass of ink stored in the reservoir increases, so does the energy required for maintaining the ink in the liquid state.

These problems are exacerbated in color printers whose print heads must be provided with a supply of inks of three or four different colors.

In an effort to resolve the conflicts between the desire to operate a printer continuously for long periods of time and the desire to minimize the moving mass represented by the print head, various arrangements for automatically replenishing the print head reservoir have been proposed. Examples of such arrangements are disclosed in U.S. Pat. Nos. 4,593,292; 4,636,803 and 4,667,206. The arrangements disclosed in these patents have in common that the replenishment operation requires a relatively complex mechanism which is itself subject to breakdown and which has a limited storage capacity. Moreover, if it were possible to adapt any of these known systems to a color printer, essentially a separate system with a separate drive device would be required for each ink color.

SUMMARY OF THE INVENTION

It is an object of the present invention to prolong the continuous operating capability of a printer, and particularly a color printer, operating with phase change inks.

Another object of the invention is to provide for rapid, automatic replenishment of the reservoir or reservoirs in a print head in a fully automatic manner.

Another object of the invention is to effect replenishment of the reservoirs of such print heads in a fail-safe and highly reliable manner.

Still another object of the invention is to effect automatic, on-demand replenishment of each reservoir of the print head of a color printer.

The above and other objects are achieved, according to the present invention, in a color printer including print head means for effecting printing with a phase change ink and provided with a reservoir for holding a supply of the ink, by the provision of an assembly composed of: ink storage means for storing a plurality of pellets of ink in the solid phase, the storage means having an outlet and a channel for supplying the pellets to the outlet by the force of gravity; pellet conveying means disposed between the storage means outlet and the reservoir of the print head means and movable between a receiving position for receiving at least one pellet from the storage means outlet and a delivery position for conveying the at least one pellet to the print head means reservoir; and drive means coupled to the pellet conveying means for moving the pellet conveying means between the receiving and delivery positions.

DESCRIPTION OF THE PREFERRED EMBODIMENTS

Figure 1:
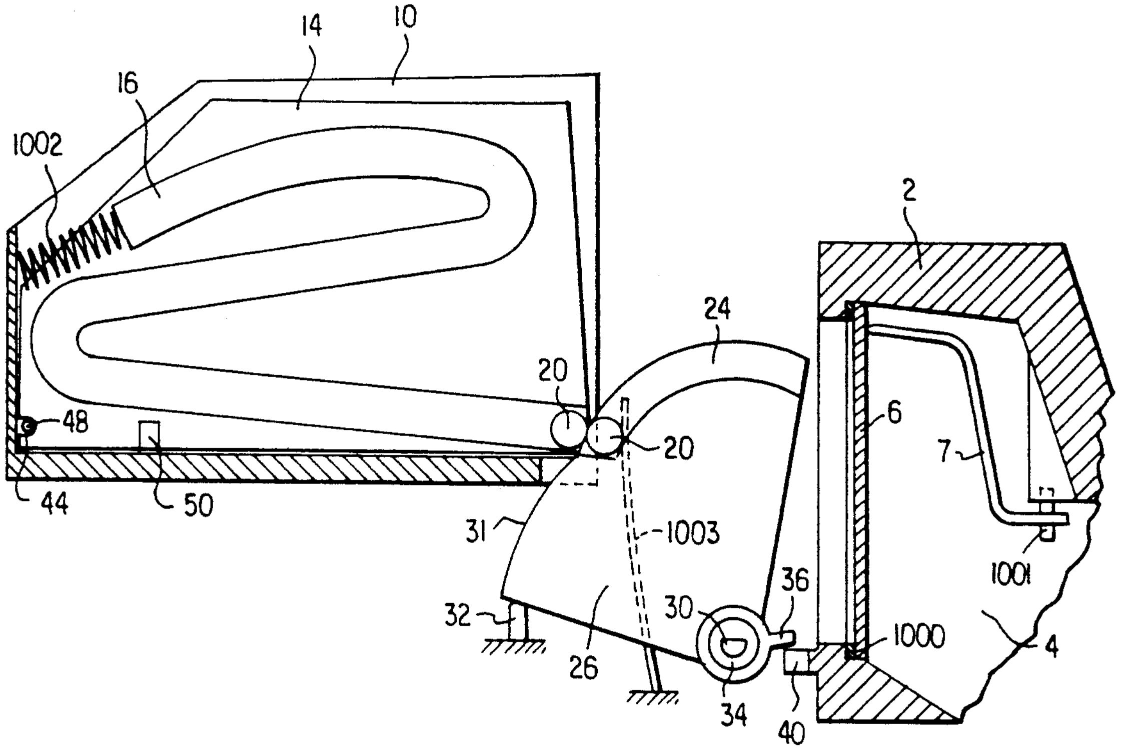
FIG. 1 is an elevational view of the basic structure of a replenishment system according to the present invention.

FIG. 1 illustrates one channel of a preferred embodiment of a replenishment system according to the present invention for a color print head, it being understood that the structure illustrated in FIG. 1 could be utilized in a single color ink printer.

The arrangement shown in FIG. 1 includes a print head 2 provided with a reservoir 4 for holding a supply of ink which is maintained in the liquid state by suitable heating means. Print head 2 may be constructed according to principles known in the art and the only structural feature of print head 2 which is part of the present invention is a door, or flap, 6 which is carried by a spring member 7 that is supported by two pins 1001 permitting door 6 to open by moving horizontally to the right. Spring member 7 produces a force urging door 6 back into its closed position shown in FIG. 1. A magnet 1000 secured in print head 2 assures complete closing of door 6. Door 6 is located at the rear of print head 2, the nozzles of the print head being located at the front side, which is not shown in FIG. 1 and which would be to the right of the illustrated portion of head 2.

Print head 2 is disposed entirely within a printer housing, along with a permanently mounted, stationary cartridge holder 10 located at a loading station adjacent one end of the scanning travel path of print head 2. Holder 10 is constructed to receive one or more solid ink pellet cartridges 14 each formed to enclose a channel 16 having a serpentine series of inclined channel segments for storing a series of solid ink pellets 20 each having the form of a solid cylinder. Channel 16 constitutes a gravity feed arrangement, assisted by a compression spring 1002 located ahead of the uphill portion of channel 16, leading to an outlet end of the channel near the bottom of cartridge 14.

When cartridge 14 is inserted into holder 10, the outlet end of channel 16 is brought into alignment with a transfer channel 24 of a transfer device 26. Device 26 is pivotally mounted on a shaft 30 supported for rotational movement in bushings mounted within the printer housing. Cartridge 14 may be provided at the outlet end of channel 16 with a closing member which is automatically retracted when cartridge 14 is installed in support 10.

Transfer device 26 is positioned and constructed to receive only a single pellet 20 at a time from cartridge 14. This is insured by a flexible plastic retaining band 1003 that is anchored relative to cartridge holder 10. Band 1003 retracts as transfer device 26 pivots clockwise. Device 26 is shown in its retracted, or pellet-receiving, position. As is apparent from FIG. 1, when print head 2 is in a position in which door 6 is aligned with device 26 and device 26 is pivoted in a clockwise direction, device 26 will first act to pivot door 6, so that the outlet end of channel 24 will be introduced to the interior of print head 2, at a location above reservoir 4. Just after the inlet end of channel 24, containing a single pellet 20, passes its highest position, by which time door 6 will be at least partially open, the single pellet 20 maintained at the inlet end of channel 24 will roll along the channel and drop into reservoir 4. At this point, device 26 is in its delivery position. This operation will normally be performed, as will be described below in response to a signal initiated within the print head and indicating that the supply of ink in reservoir 4 has dropped to a certain level. Devices for indicating ink level in a reservoir are known in the art.

During pivoting of device 26 toward its delivery position, the outlet end of channel 16 will be closed by a suitably configured blocking surface 31 formed on device 26.

Upon completion of a delivery operation, the direction of rotation of shaft 30 is reversed to return device 26 to the receiving position shown in FIG. 1. At this time, the outlet end of channel 16 is open and a single new pellet 20 will be delivered, under the influence of gravity, to the inlet end of channel 24. It will be noted that the retaining band 1003 projects into channel 24 to assure that only a single pellet 20 can be received in channel 24 at a given time and the next succeeding pellet 20 will be in a position to be restrained by surface 31 during pivoting movement of the device 26 to its delivery position. The receiving position of device 26 is defined by a stop 32 fixed within the printer housing.

As illustrated in FIG. 1, shaft 30 has, at least in the region occupied by device 26, a D-shaped cross section. Shaft 30 additionally carries a plurality of washers 34 each of which has a mating D-shaped opening so that each washer 34 will rotate as a unit with shaft 30. On the other hand, device 26 itself is provided with a circular opening through which shaft 30 passes so that device 26 is not driven directly by shaft 30. Rather, a respective washer 34 is pressed against each side of device 26 to provide a friction coupling between shaft 30 and device 26.

Device 26 further carries a control finger 36 which will engage a ledge 40 on print head 2 when print head 2 is not in a position to receive a pellet from device 26. Ledge 40 is provided with an opening through which finger 36 can move when print head 2 is in the proper position to receive a pellet 20. When print head 2 is in this position and shaft 30 is rotated in the clockwise direction, the delivery operation described above will proceed.

It will be seen that the device illustrated in FIG. 1 effects movement of pellets 20 essentially under the influence of gravity, with the only positive drive being that applied to shaft 30.

The form of cartridge 14 and channel 16 is such as to provide a large supply of pellets, allowing for unattended operation of the printer for a relatively long period of time. Each replenishment operation requires only a short period of time, and can normally be carried out between the printing of successive pages without creating any noticeable interruption in the printing operation.

However, it will, from time to time, be necessary to replace cartridge 14 with a fresh cartridge. Therefore, holder 10 and cartridge 14 are designed to permit cartridge 14 to be replaced rapidly and easily. Moreover, particularly for the case of color printers, provision is made to prevent insertion of a cartridge containing an incorrect ink type or color. Insertion of a cartridge 14 is effected by first engaging a recess 44 at the rear of cartridge 14 around pins 48 secured to vertical walls of holder 10 and then pivoting cartridge 14 downwardly into the installed position shown in FIG. 1.

During this installation movement, an opening in the bottom of cartridge 14 is engaged by a pin 50 extending upwardly from the bottom wall of holder 10. The position of pin 50 corresponds to the ink color and type which is to be provided at that location and the opening in the bottom of cartridge 14 is correspondingly located in dependence on the type and color of the ink pellets contained in that cartridge. Therefore, only if the ink in cartridge 14 corresponds to that which is to be inserted at the particular location of holder 10 can cartridge 14 be fully installed.

Thus, in an ink jet printer requiring inks of three or four different colors, holder 10 would include three or four different receiving regions each having a pin 50 at a respectively different location.

Figure 2:
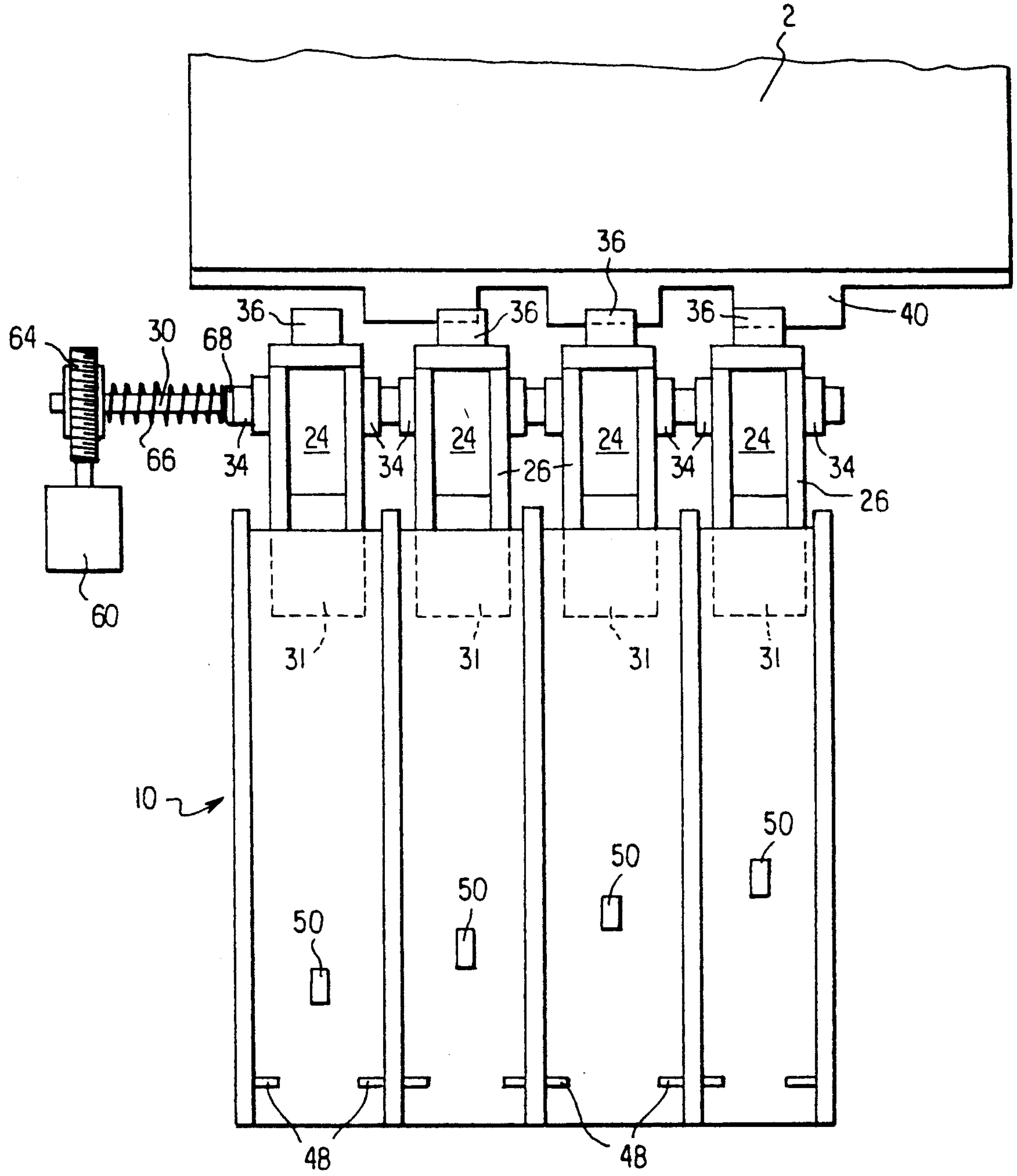
FIG. 2 is a plan view of the system shown in FIG. 1.

The manner in which delivery of ink pellets to print head reservoirs is controlled with the embodiment shown in FIG. 1 will be explained in detail with reference to FIG. 2 which is a plan view illustrating holder 10 constructed to receive cartridges 14 containing four different ink colors, the cartridges not being shown, as well as four transfer devices 26 and a portion of print head 2. FIG. 2 further illustrates a motor 60 connected, for example by a worm and spur gear train 64, to shaft 30. Motor 60 will be operated, according to principles known in the art, when a signal indicating that one or more of the reservoirs in print head 2 are to be replenished and print head 2 is in the loading station associated with holder 10, such as illustrated in FIG. 2. A signal indicating that one of the print head reservoirs must be replenished will additionally be used to position print head 2 to bring the appropriate reservoir into alignment with the corresponding transfer device 26. Techniques for bringing a print head to any desired position are already well known in the art and will not be described in detail here.

In FIG. 2, print head 2 is in position to permit replenishment of the reservoir at the left-hand end of print head 2. At this time, the finger 36 associated with the left-hand transfer device 26 is aligned with one opening provided in ledge 40. The openings in ledge 40 are arranged, as shown, so that, for any given position of print head 2 only one of those openings will be aligned with an associated finger 36.

When print head 2 is in the position shown in FIG. 2, motor 60 is driven so as to rotate shaft 30 in a direction to move the left-hand transfer device 26 from its receiving position to its delivery position, whereupon a pellet is delivered to the appropriate ink reservoir. The pivoting movement of the left-hand transfer device 26 is produced by transfer of the rotational force produced by shaft 30 to that device 26 via the two friction washers 34 adjacent that transfer device 26. With regard to the other devices 26, engagement of their fingers 36 with ledge 40 prevents them from undergoing more than a very small pivoting movement.

After a predetermined period of time, which can be quite short, sufficient to assure that delivery of a pellet 20 has occurred, the direction of rotation of motor 60 is reversed and the left-hand transfer device is returned to its pellet receiving position, defined by stop 32 of FIG. 1, whereupon a further pellet is automatically delivered to the receiving end of channel 24 of that transfer device.

Frictional contact between washers 34 and devices 26 is maintained by a compression spring 66 located at one end of shaft 30 and acting to force all washers 34 and devices 26 against one another. A retaining ring 68 may be disposed at the opposite end of the washer-transfer device assembly.

During a given transfer operation, more than one print head reservoir may be replenished. To achieve this, the operation described above is performed, after which print head 2 is displaced to bring a different opening in ledge 40 into alignment with a different transfer device 26, after which motor 60 is again rotated first in the forward direction and then, after a brief waiting period, in the reverse direction.

FIG. 2 additionally illustrates the manner in which pins 50 may be arranged to constitute keys which will permit only a given type of cartridge to be installed at any one cartridge receiving location.

It will be appreciated that a significant advantage of the embodiment illustrated in FIGS. 1 and 2 is that the correct delivery of an ink pellet is controlled in an essentially fail-safe manner by a mechanical structure which allows only one transfer device 26 to operate at a time and this only when print head 2 is properly positioned relative to that device. Moreover, a significant advantage of the present invention is that the delivery of ink pellets of a plurality of different colors is effected by a single prime mover, motor 60, which, because it transfers pivotal movement to devices 26 by friction couplings, will pivot only the desired transfer device 26 to effect a pellet delivery operation.

Figure 3:
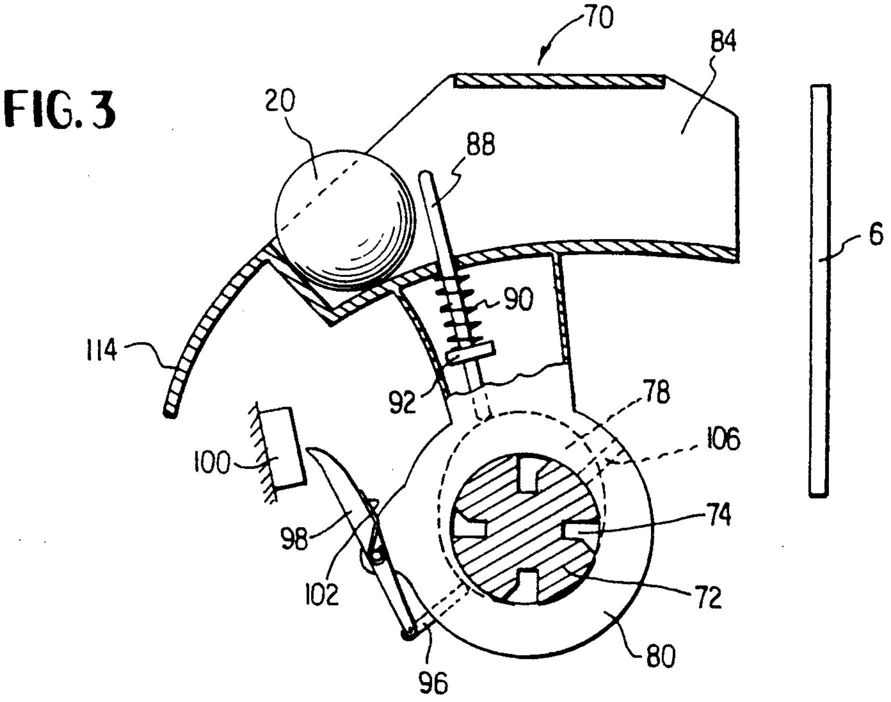
FIG. 3 is an elevational view partly in cross section, of an alternative pellet transfer device according to the present invention.

A second embodiment of a dispensing device according to the present invention is illustrated in FIG. 3. Conceptually, this embodiment differs from that of FIGS. 1 and 2 in that it does not require a friction drive between the single prime mover and the individual dispensing devices but requires a timing signal to control the ink pellet selection.

The embodiment illustrated in FIG. 3 also differs from that of FIGS. 1 and 2 in that the spacing between individual pellet dispensers is the same as the spacing between individual ink reservoirs so that the print head need not be moved when more than one ink pellet is to be delivered.

The dispensing device shown in FIG. 3 can be associated with ink supply cartridges mounted in a cartridge holder in the same manner as illustrated in FIGS. 1 and 2.

The device shown in FIG. 3 includes a pellet transfer unit 70 mounted on a shaft 72 which can be coupled to a single drive motor either by a gear arrangement of the type shown in FIG. 2 or by another type of coupling arrangement. Thus, the motor (not shown) driving shaft 72 can have any desired orientation, as is true for motor 60 shown in FIG. 2. Shaft 2 is provided with a plurality of selecting holes 74, one for each ink color, and carries a plurality of selection cams 78, one of which is shown in broken lines, there also being one cam 78 for each ink pellet color.

Unit 70 includes a support tube, or cylinder, 80 which is mounted on shaft 72 and is dimensioned to itself be freely pivotable relative to shaft 72.

Tube 80 carries, via one or more arms, a pellet conveying member presenting four parallel channels 84, only one of which is visible, the other channels being located therebehind perpendicular to the plane of the drawing.

Each channel 84 has, at its left-hand end, a pellet receiving region dimensioned to receive a single pellet from an associated cartridge and, at the right-hand end of the channel, an outlet via which pellet 20 will be introduced into an associated reservoir within the print head after door 6 has been pushed open by suitable wall members at the outlet end of the channel.

Each channel 84 is provided with a respective gate 88 which extends through an opening in the bottom of the channel and whose movement is controlled by a respective one of cams 78. Each gate 88 is maintained in contact with its associated cam 78 by a compression spring member 90 interposed between the channel bottom and a retaining member 92 fixed to gate 88. When gate 88 is in the position illustrated, the transfer of a pellet 20 is prevented.

Each cam 78 is configured to have a low portion which will permit gate 88 to move downwardly in order to unblock the associated channel 84. The four cams 78 are angularly offset from one another about the axis of shaft 72 by mutual angles of 90° so that only one gate 88 can be open at a time. Preferably, each cam 78 is configured so that the low portion thereof which effects gate opening subtends an angle of less than 90°.

All cams 78 are fixed for rotation with shaft 72, while tube 80 is free to pivot relative to shaft 72. However, tube 80 can be selectively coupled to shaft 72 by inward radial movement of a selection pin 96 which extends radially through tube 80. The movement of pin 96 is effected by a two-armed lever 98 which is mounted to pivot about an axis fixed to tube 80 and whose movement relative to tube 80 is controlled by a stationary stop member 100 fixed to the printer chassis. Lever 98 is biased by a torsion spring 102 to urge pin radially inwardly toward the axis of shaft 72.

Since ink pellet selection is effected by cams 78, channels 84 can have the same mutual spacing as the print head ink reservoirs. This means that the print head can be placed in a single defined position for replenishing any reservoir and several reservoirs can be replenished in sequence without moving the print head. Moreover, the plurality of doors 6 employed in the embodiment of FIG. 1 can be replaced by a single door covering all reservoirs, and the provision of a single door will have the advantage of reducing the problems involved in sealing the door edges when the door is closed.

At the start of a dispensing operation, unit 70 is in the illustrated position and all doors 6, or the single door, of the print head are closed.

As in the case of the embodiment shown in FIGS. 1 and 2, unit 70 is provided with a blocking wall 104 which effectively closes the outlet end of each pellet cartridge until the device returns to its retracted, or pellet receiving, position, at which time the channel which is then empty can receive a new pellet.

Tube 80 is further provided with a transport hole 106 into which a separate pin may be inserted when the printer is being transported to maintain unit 70 in a fixed position during shipment.

Before a pellet delivery operation is performed, a selection must be made of the ink pellet 20 to be delivered to a print head reservoir.

This selection is made by operating the motor driving shaft 72 under control of a logic circuit to insert pin 96 in the appropriate hole 74.

Shaft 72 is associated with a rotation sensor which produces a signal pulse each time shaft 72 undergoes a 90° rotation and the logic circuit initially contains information identifying the color of the ink pellet which was last dispensed. As will be seen, this information is indicative of the angular position of shaft 72 at the completion of the previous loading procedure. The circuit further contains information identifying the color of the ink pellet which is to be dispensed during the next loading operation and this information is indicative of the angular position in which shaft 72 must be placed to allow pin 96 to engage the correct hole 74.

These two items of information are logically linked to produce a count signal representing the number of 90° increments through which shaft 72 must rotate relative to tube 80 to perform the desired ink color selection.

Figure 4:
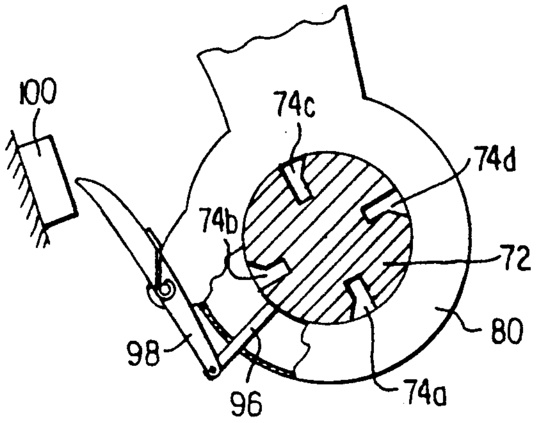
FIG. 4 is an elevational detail view illustrating the operation of the device of FIG. 3.

Referring to FIG. 4, during the previous loading operation pin 96 was engaged in hole 74*a* and at the completion of that loading operation shaft 72 and tube 80 are left in the angular positions shown in FIG. 4. In the following description, clockwise rotation of shaft 72 and/or tube 80 will be referred to as forward rotation and counterclockwise rotation will be referred to as reverse rotation.

A selecting procedure is initiated by a signal indicating that the print head is at the loading station and a signal indicating that a given reservoir is to be replenished, the latter signal being supplied by known reservoir fill level sensing means associated with each reservoir. If the latter signal indicates that pin 96 must engage hole 74*c* for the next loading operation, the logic circuit is set to receive two signal pulses from the rotation sensor before the loading operation is performed.

The selection operation proceeds as follows:

Shaft 72 undergoes reverse rotation while tube 80 is held stationary due to the fact that pin 96 is riding on the outer surface of shaft 72 and lever 98 bears against stop 100, although at this time lever 98 is not fully depressed by stop 100.

When hole 74*b* comes into alignment with pin 96, lever 98 is no longer restrained by the outer surface of shaft 72. The force of compressed spring 102 on lever 98 causes the operating end of lever 98 to press against stop 100 and causes a small forward rotation of tube 80 so that pin 96 is able to enter hole 74*b*.

Tube 80 then undergoes reverse rotation along with shaft 72 until lever 98 is again pressed by stop 100 to a point at which pin 96 is retracted from hole 74*b*. This retraction is aided by the fact that each hole 74 has a sloping surface at the side which bears against pin 96 when shaft 72 undergoes reverse rotation. Then, tube 80 again undergoes a small forward rotation as lever 98 presses against stop 100 and, shortly thereafter, shaft 72, which is still undergoing reverse rotation, reaches an angular position at which a signal pulse is produced by the rotation sensor.

Reverse rotation of shaft 72 continues until, in the same manner as described above, pin 96 engages in, and is then retracted from, hole 74*c*. The signal pulse then produced by the rotation sensor during continued reverse rotation of shaft 72 indicates to the logic circuit that hole 74*c* is the hole which must be engaged by pin 96 to dispense the desired ink pellet. At this point, shaft 72 is halted with hole 74*c* in the position in which hole 74*a* is shown in FIG. 4.

Then, shaft 72 is rotated forward, pin 96 again enters hole 74*c* and shaft 72 and unit 70 continue to rotate forward so that unit 70 is pivoted into the pellet dispensing position.

Shaft 72 and unit 70 are held in the dispensing position for a selected time, after which shaft 72 undergoes reverse rotation, lever 98 engages stop 100 to retract pin 96 from hole 74*c* and shaft 72 continues reverse rotation until the rotation sensor produces another signal pulse, which acts to halt shaft 72 and leave the mechanism in position for the next selection and loading operation.

During forward rotation of shaft 72 to move unit 70 to its dispensing position, shaft 72 rotates through an angle of less than 90° so that no signal pulse is produced by the rotation sensor.

Another dispensing operation for a different color ink pellet can be carried out before the print head leaves the loading station.

Figure 5:
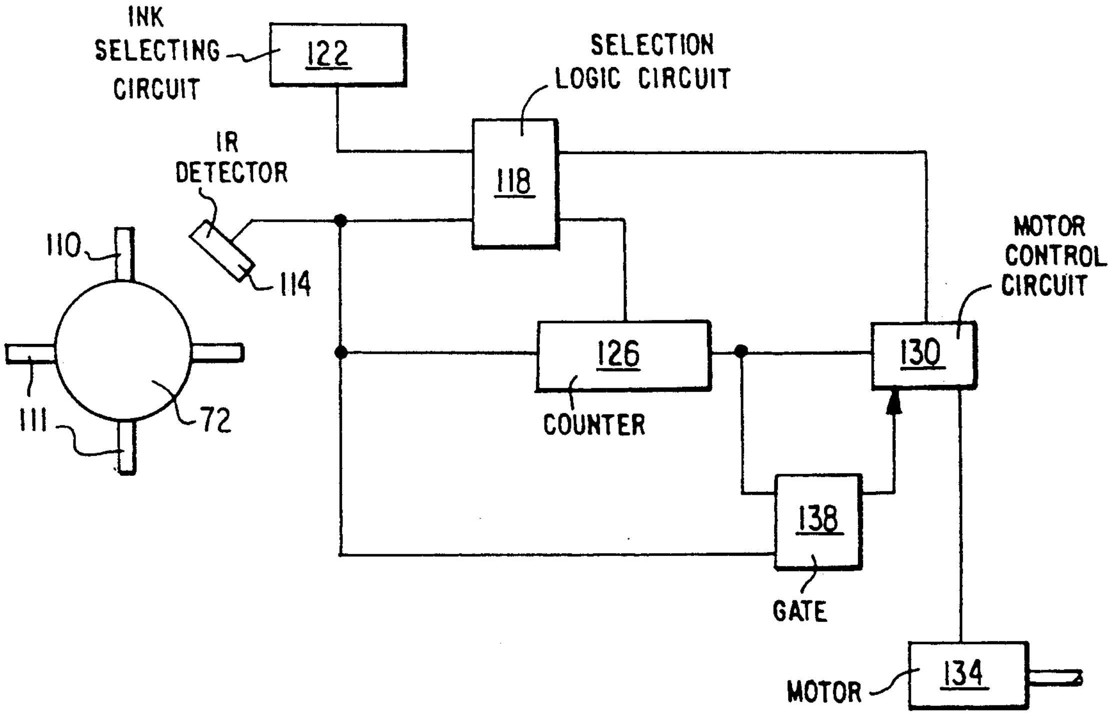
FIG. 5 is a block diagram of a control system for the device of FIGS. 3 and 4.

A suitable arrangement of sensing and control components for the embodiment of FIGS. 3 and 4 is shown in FIG. 5. These components include angular position indicating pins 110 and 111 projecting radially from shaft 72 and spaced 90° apart. Pins 110, 111 are located to intersect an infrared light barrier including an IR detector 114 during rotation of shaft 72. Whenever, during rotation of shaft 72, a pin 110 or 111 intersects the barrier, infrared detector 114 produces a corresponding signal pulse. There is only one pin 110 which is wider than, for example twice as wide as, each of the three pins 111, so that the signal produced by detector 114 when the barrier is intersected by pin 110 will indicate a unique reference position of shaft 72. This signal can be used to initialize the selection circuitry.

The signal pulses from detector 114 are supplied to a selection logic circuit 118 which also receives a signal identifying the next ink pellet color to be loaded from an ink selecting circuit 122 which receives reservoir fill level signals.

Circuit 118 can be initialized as described above to store an identification of the ink color associated with that position of shaft 72 in which pin 110 intersects the infrared light barrier. This identification changes in response to each signal pulse produced by detector 114 during reverse rotation of shaft 72.

Upon arrival of a signal from circuit 122, circuit 114 determines the number of signal pulses which must be produced by circuit 114 to select the desired ink color. If the color is the same as that dispensed during the previous operation, four signal pulses must be produced to reliably bring shaft 72 to the proper color selection position.

A representation of the number of pulses thus determined is then supplied to set a down-counter 126 to a starting count corresponding to that number of pulses. At the same time, circuit 118 is set to ignore the signal pulse which will be emitted by detector 114 after the determined number of pulses has been produced, the pulse to be ignored being that produced when unit 70 is returned to its receiving position at the end of a dispensing operation. In addition, circuit 118 sends a start signal to a motor control circuit 130 which is connected to drive a motor 134 which is coupled to shaft 72. The output of detector 114 is also connected to the count input of counter 126.

Upon receipt of the start signal, circuit 130 causes motor 134 to rotate in the reverse direction while counter 126 counts down in response to each signal pulse supplied to its count input until the count output from counter 126 reaches zero. At this time, circuit 130 carries out a timed operating sequence in which shaft 72 is rotated forward through a selected angle of less than 90°, motor 134 is halted for a predetermined time while an ink pellet is dispensed, and motor 134 is then rotated in the reverse direction.

The output of counter 126 is also connected to the control input of a gate 138 which has a signal input connected to the output of detector 114. Gate 138 has a signal output connected to a stop input of circuit 130. When counter 126 reaches a count of zero, gate 138 is enabled to pass the next signal pulse from detector 114 to the stop input of circuit 130, causing operation of motor 134 to halt until the next dispensing operation is to be performed.

If several different ink pellets are to be dispensed at a given time, the operation described above can be performed the requisite number of times while the print head is in position to receive those pellets.

The complete operating circuit also includes means for indicating that the print head is halted at the loading station, which means can be conventional and are not illustrated.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a color printer including print head means for effecting printing with a phase change ink and provided with a plurality of reservoirs each for holding a supply of ink of a respectively different color, the improvement comprising: ink storage means removably held in the printer for storing a plurality of pellets of ink in solid phase, said ink storage means being composed of a plurality of storage devices, each of the storage devices having an outlet and a supply channel for storing a plurality of pellets of ink of a respectively different color in solid phase and for supplying the pellets to said outlet at least in part by gravitational force; pellet conveying means disposed between said storage device outlets and said reservoirs of said print head means and movable between a receiving position for receiving at least one pellet from a storage device outlet and a delivery position for conveying a pellet received in the receiving position to a reservoir of said print head means; drive means coupled to said pellet conveying means for moving said pellet conveying means between said receiving and delivery positions; and selecting means operatively associated with said pellet conveying means for selecting a pellet of ink of a given color for conveyance by said conveying means to a corresponding reservoir, wherein said pellet conveying means have a plurality of pellet conveyance channels each associated with a respective storage device and a respective reservoir.

2. The printer defined in claim 1 wherein said pellet conveying means comprise a plurality of independently movable conveying members each provided with a respective one of said conveyance channels.

3. The printer defined in claim 2 wherein said drive means comprise a single drive device connected for operating said pellet conveying means.

4. The printer defined in claim 3 wherein said drive means are coupled for applying a drive force to each of said conveying members, and said selecting means are coupled with said conveying members for permitting only one of said conveying members to be moved from said receiving position to said delivery position at a given time.

5. The printer defined in claim 4 wherein said print head means reservoirs are separated from one another by a first spacing and said conveying members are separated from one another by a second spacing which is different than the first spacing, and said selecting means comprise: a plurality of movement limiting members each secured to a respective conveying member; and a selection control member mounted on the print head means for permitting movement of only a selected one of said conveying members to said delivery position of said pellet conveying means.

6. The printer defined in claim 5 wherein said selection control member comprises a ledge mounted on the print head means to project toward said pellet conveying means for engagement by said movement limiting members, said ledge being provided with a plurality of openings each located to permit passage of a respective movement limiting member when the print head means is at a position where one of said reservoirs associated with said one of said conveying members to which the respective movement limiting member is secured is aligned with said one of said conveying members.

7. The printer defined in claim 6 wherein said drive means comprise a friction transmission coupled to all of said conveying members.

8. The printer defined in claim 1 wherein said drive means comprise a single drive device connected for operating said pellet conveying means.

9. The printer defined in claim 8 wherein all of said conveyance channels are movable in unison between said receiving and delivery positions and said selecting means comprise blocking elements disposed for individually blocking each said conveyance channel in order to prevent conveyance of a pellet along said channel, and a mechanism coupled to said blocking elements for moving a selected blocking element in order to unblock one said conveyance channel at a time.

10. The printer defined in claim 9 wherein said drive means comprise a shaft connected to be rotated by said drive device, and coupling means coupling said shaft to said pellet conveying means.

11. The printer defined in claim 10 wherein said mechanism comprises a plurality of camming members each secured to said shaft and each disposed for moving a respective blocking element in response to rotation of said shaft relative to said pellet conveying means.

12. The printer defined in claim 11 wherein said coupling means comprise a connecting device movable between an engaging position for connecting said shaft to said pellet conveying means and a disengaging position for disconnecting said shaft from said pellet conveying means in order to permit said shaft to rotate independently of said pellet conveying means.

13. The printer defined in claim 12 wherein said shaft is rotatable in a forward direction for moving said pellet conveying means from said receiving position to said delivery position and in a reverse direction for moving said pellet conveying means from said delivery position to said receiving position, and said connecting device is movable to said disengaging position only during rotation of said shaft in said reverse direction.

* * * * *